F. J. MOHR.
FLOUR SIFTER.
APPLICATION FILED FEB. 25, 1918.
1,298,626.
Patented Mar. 25, 1919.
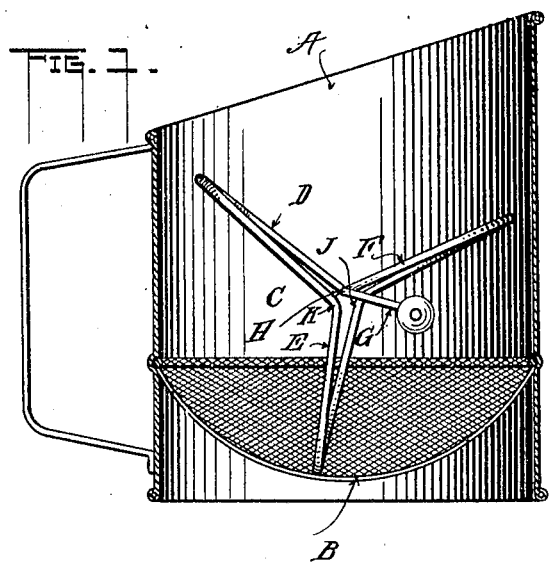
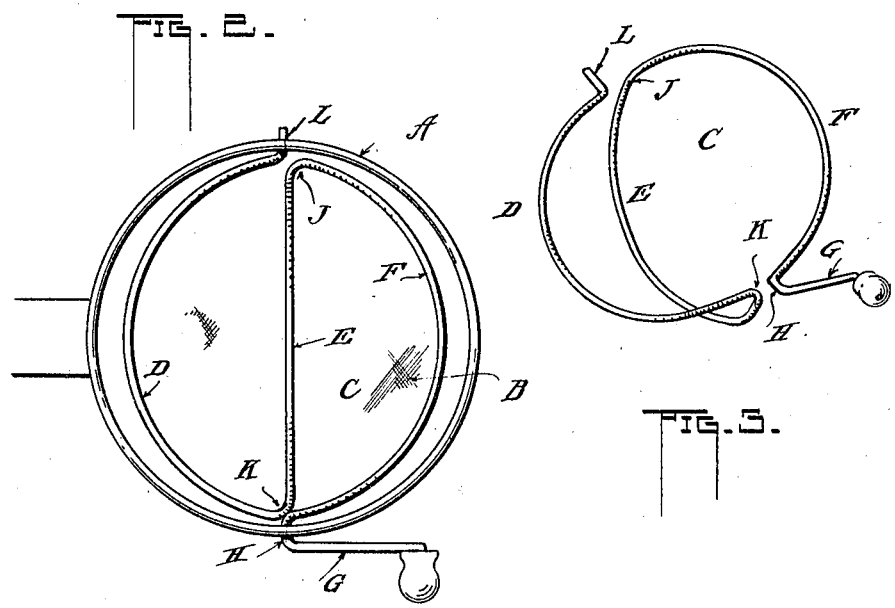
Inventor:
Frank J. Mohr,

UNITED STATES PATENT OFFICE.

FRANK J. MOHR, OF PEORIA, ILLINOIS, ASSIGNOR TO STUBER & KUCK COMPANY, OF PEORIA, ILLINOIS, A CORPORATION OF ILLINOIS.

FLOUR-SIFTER.

1,298,626.    Specification of Letters Patent.    Patented Mar. 25, 1919.

Application filed February 25, 1918. Serial No. 218,970.

*To all whom it may concern:*

Be it known that I, FRANK J. MOHR, a citizen of the United States, residing at Peoria, in the county of Peoria and State of Illinois, have invented certain new and useful Improvements in Flour-Sifters; and I do hereby declare that the following is a full, clear, and exact description of the invention, which will enable others skilled in the art to which it appertains to make and use the same.

This invention relates to improvements in flour sifters. It relates to a flour sifter of the portable type adapted particularly for domestic use.

The object of the invention is to provide a sifter having an agitator of a peculiar novel construction, each of whose arms for engaging the sieve portion can easily and readily flex so as to have a positive rubbing contact upon the said sieve portion.

Another object is to provide an agitator consisting of a single length of spring wire that will readily flex or that will be elastic enough to positively rub upon the sieve and still retain its shape.

Another object is to provide an agitator of a single length of spring wire formed into a plurality of rubbing arms that can be constructed at low cost and that can be quickly placed in its operative position through the walls of a sifter without any parts whatever to secure it in that position.

To the end that the invention may be understood, I have provided the accompanying drawing, showing the invention as I prefer to construct it, though it is to be understood that slight changes may be made without departing from the spirit of the invention or the meaning of the appended claims.

Figure 1 is a vertical section of a flour sifter showing my improved form of agitator.

Fig. 2 is a plan of the same; and,

Fig. 3 shows the detached agitator in perspective.

A indicates the sifter body furnished with the usual spherically curved bottom B of foraminous material secured in place in any approved manner, C representing, as a whole, my improved agitator. Said agitator comprises a plurality of arms D, E, F, each of which is arched or curved so as to fit into and rub upon the described spherically curved sieve bottom B, the entire agitator consisting of a single length of wire.

One extremity of the arm F terminates at one end in a crank portion G having its bearing at H in the usual aperture (not shown) in one side of the sifter body. At its other extremity said arm F continues into the arm E, there being included at the juncture of the arms F E a short bend J which lies near the axis of rotation, in Fig. 2. The arm E at the other side of the sifter body bends or extends into the arm D, there being a short bend at K lying near the axis of rotation at that side. The free extremity of the arm D indicated at L extends through and is journaled in an aperture (not shown) in the body adjacent the described bend J. The agitator thus formed has its three described arms spaced substantially equally from one another as shown in Fig. 1. While three arms are preferably employed it is understood that but two arms or more than three of them may be furnished if desired and spaced from one another accordingly.

The use of three as stated is preferable, however, from the fact that one will follow the other sufficiently close to accomplish the sifting as rapidly as necessary and from the further fact that the three arms will provide more flexibility, perhaps, than two and yet would be more rigid and satisfactory in operation than a greater number than three.

Since the one piece agitator is journaled at its extremities and is of considerable length and is provided for its free flexing movement throughout, not being supported at the bends J K in any way, each arm as it meets and passes over the sieve B will have perfect flexing action and each will properly rub upon and snugly fit in said sieve portion.

If the points of bearings at H L are set slightly closer to the lowermost portion of the sieve than the radius of the circle described by the arms it is clear that the described rubbing action will be positive and that each arm must yield as it meets and moves over the sieve with good contact.

The agitator is placed within the body by introducing the end L through one of the described apertures thereof passing the whole length through said aperture in a winding action until having been entirely inclosed the said extension L is sprung through the aperture in the other side of the body, the sifter being then ready for use. There is no tendency of the agitator to leave its position, after being placed in position, under the hardest usage.

In addition to the advantage in operation the agitator by reason of its one piece form can be manufactured at quite a low cost as compared with the ordinary forms or those in common use, and because no extra parts are required to secure the several arms relatively to one another. As a matter of fact securing of the arms in this way is the very thing to be avoided since it is found that to get the best results in operation the arms should be free to flex.

Having thus described my invention, I claim:—

1. As an article of manufacture, an agitator for a sifter consisting of a single length of wire including terminal portions constituting supporting shaft-ends, said wire between said ends being bent to form a plurality of spaced independent arc shaped arms radiating from the axis of rotation of the agitator and free to flex independently of one another and to flex with the wire throughout its entire length between said shaft-ends in a lateral direction.

2. In combination with a flour sifter body having a spherically curved sifter bottom, said body including a pair of openings in its side above said bottom, one diametrically opposite the other, an agitator consisting of a single length of wire whose extremities have bearings in said openings, said wire between its said ends being formed into a plurality of arms curved outward from the axis of rotation and substantially conforming to the curve of said sifter bottom and substantially equally spaced from one another in the direction of rotation, the wire being free to flex throughout its length and adapted by its form to be introduced into operative position within the body through one of the openings, the path of travel of the arms describing a circle the center of which is offset from the center from which the curve of the bottom is struck whereby to cause a rubbing contact of each arm upon the said bottom during rotation.

In testimony whereof I affix my signature, in presence of two witnesses.

FRANK J. MOHR.

Witnesses:
A. LEHNDORF,
E. WRIGHT.